No. 666,925. Patented Jan. 29, 1901.
W. O. DYE.
NUT LOCK.
(Application filed June 4, 1900.)
(No Model.)
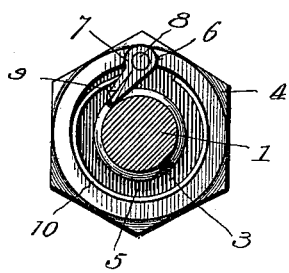
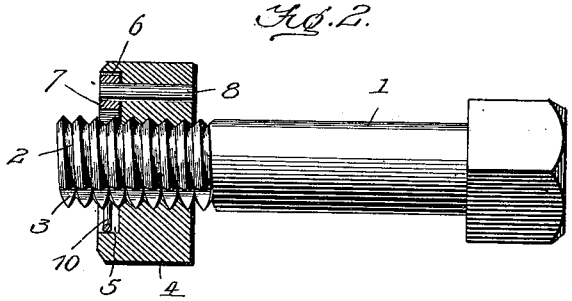
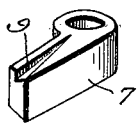
Witnesses
Harry S. Rohrer
Herbert D. Lawson
Inventor
Willard O. Dye.
By Victor J. Evans.
Attorney
THE NORRIS PETERS CO., PHOTO-LITHO., WASHINGTON, D. C.

UNITED STATES PATENT OFFICE.

WILLARD OSCAR DYE, OF CLYDE, MICHIGAN.

NUT-LOCK.

SPECIFICATION forming part of Letters Patent No. 666,925, dated January 29, 1901.

Application filed June 4, 1900. Serial No. 19,022. (No model.)

*To all whom it may concern:*

Be it known that I, WILLARD OSCAR DYE, a citizen of the United States, residing at Clyde, in the county of Oakland and State of Michigan, have invented new and useful Improvements in Nut-Locks, of which the following is a specification.

This invention relates to new and useful improvements in nut-locks; and its primary object is to provide a strong and simple device having means whereby a nut may be securely locked upon a bolt at any desired point thereon.

To these ends the invention consists in providing the threaded portion of the bolt with longitudinally-extending grooves which are adapted to be engaged by a pawl pivotally mounted upon a pin within a recess formed in the face of the nut, which pin is held normally in contact with the bolt by means of a spring which bears upon the walls of the recess and is held in position thereby. The pawl is provided with means whereby the same may be readily lifted out of engagement with the slots of the bolt.

The invention also consists in the further novel construction and combination of parts hereinafter more fully described and claimed and illustrated in the accompanying drawings, showing the preferred form of my invention, and in which—

Figure 1 is an end view thereof. Fig. 2 is a longitudinal section through the nut applied to a bolt, and Fig. 3 is a detail view of the pawl.

Referring to said figures by numerals of reference, 1 is a bolt, the threaded portion 2 of which is provided with one or more longitudinally-extending grooves 3, which grooves are each provided with perpendicular and inclined walls, as shown. The nut 4 is adapted to engage the threaded portion of the bolt, and this nut is provided in its outer face with an annular recess 5, the wall of which is cut away at 6 to receive the end of a pawl 7, which is pivotally mounted upon a pin 8, preferably extending through the nut and riveted thereto. This pawl is provided upon its outer face with a longitudinally-extending groove 9, having a perpendicular wall, as shown, and said pawl is held normally in contact with the bolt by means of a spring 10, which is fitted within the recess of the nut and is held in position therein by the walls of said recess.

It will be seen that when the nut is screwed upon the bolt the pawl will slip over the longitudinal grooves 3, but that said pawl will engage with the grooves when the motion of the nut is reversed, it being thrown into engagement therewith by the spring 10. When it is desired to unscrew the nut, an instrument having a sharp edge is placed within the groove of the pawl, thereby permitting the same to be thrown outward. It would be, as is obvious, impossible to throw the pawl out of engagement with the groove of the bolt by placing an instrument between said pawl and the bolt, as it is necessary to place said instrument at a point between the fulcrum and the contacting end of the pawl.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as fairly fall within the scope of my invention.

Having thus fully described my invention, what I claim as new, and desire to secure by Letters Patent, is—

The combination with a bolt having a longitudinally-extending groove therein, of a nut mounted thereon having an annular recess in its outer face, a pawl pivoted within the wall of the recess and provided with a groove within its outer face which is adapted to be engaged by releasing means, a spring within the recess and encircling the bolt, said spring bearing upon the wall of the recess and adapted to hold the pawl normally in contact with the bolt.

In testimony whereof I affix my signature in presence of two witnesses.

WILLARD OSCAR DYE.

Witnesses:
C. A. WILSON,
EMMA SARGENT.